United States Patent
Laporte et al.

(10) Patent No.: US 12,034,504 B2
(45) Date of Patent: Jul. 9, 2024

(54) PIM DOWNLINK SUBSPACE ACQUISITION METHOD

(71) Applicant: Telefonaktiebolaget LM Ericsson (publ), Stockholm (SE)

(72) Inventors: Pierre-Andre Laporte, Gatineau (CA); Mark Wyville, Ottawa (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 176 days.

(21) Appl. No.: 17/911,481

(22) PCT Filed: Apr. 3, 2020

(86) PCT No.: PCT/IB2020/053226
§ 371 (c)(1),
(2) Date: Sep. 14, 2022

(87) PCT Pub. No.: WO2021/198741
PCT Pub. Date: Oct. 7, 2021

(65) Prior Publication Data
US 2023/0087335 A1    Mar. 23, 2023

(51) Int. Cl.
*H04B 7/0456*    (2017.01)
*H04B 7/06*    (2006.01)

(52) U.S. Cl.
CPC ......... *H04B 7/0456* (2013.01); *H04B 7/0617* (2013.01)

(58) Field of Classification Search
CPC .. H04B 7/0456; H04B 7/0617; H04B 7/0632; H04B 7/0634; H04B 7/0626; H04B 7/063; H04B 7/0615; H04W 72/542; H04W 72/541
See application file for complete search history.

(56) References Cited

U.S. PATENT DOCUMENTS

| | | | | |
|---|---|---|---|---|
| 7,551,682 B2* | 6/2009 | Na | ........................ | H04B 7/0634 375/267 |
| 2011/0170521 A1* | 7/2011 | Wang | .................... | H04B 7/0617 370/336 |
| 2014/0045510 A1* | 2/2014 | Yue | ........................ | H04B 7/0632 455/450 |

(Continued)

FOREIGN PATENT DOCUMENTS

| | | |
|---|---|---|
| WO | 2019/220180 A1 | 11/2019 |
| WO | 2021/009548 A1 | 1/2021 |

OTHER PUBLICATIONS

International Search Report and Written Opinion dated Jun. 4, 2020 issued in PCT Application No. PCT/IB2020/053226, consisting of 14 pages.

*Primary Examiner* — Khanh C Tran
(74) *Attorney, Agent, or Firm* — Weisberg I.P. Law, P.A.

(57) ABSTRACT

A method and radio in a network node for passive intermodulation (PIM) downlink subspace acquisition. According to one aspect, a method includes determining a downlink projection matrix that is formed using the downlink beamforming weights and determining a first downlink interference covariance matrix estimate for a current downlink orthogonal frequency division multiplexed, OFDM, symbol based at least in part on multiplying the downlink projection matrix by a scaling factor that is dependent on the passive intermodulation, PIM, power generated in one or more uplink channels.

22 Claims, 6 Drawing Sheets

(56) References Cited

U.S. PATENT DOCUMENTS

| | | | |
|---|---|---|---|
| 2015/0350940 A1* | 12/2015 | Wilson | H04B 1/1027 |
| | | | 370/252 |
| 2018/0175983 A1 | 6/2018 | Yum | |
| 2020/0229201 A1* | 7/2020 | Tong | H04B 7/0632 |
| 2021/0143885 A1* | 5/2021 | Gro?mann | H04B 7/0478 |
| 2022/0094414 A1* | 3/2022 | Raghavan | H04B 7/088 |

* cited by examiner

PIM DOWNLINK SUBSPACE ACQUISITION METHOD

CROSS-REFERENCE TO RELATED APPLICATIONS

This application is a Submission Under 35 U.S.C. § 371 for U.S. National Stage Patent Application of International Application Number: PCT/IB2020/053226, filed Apr. 3, 2020 entitled "PIM DOWNLINK SUBSPACE ACQUISITION METHOD," the entirety of which is incorporated herein by reference.

TECHNICAL FIELD

This disclosure relates to wireless communication and in particular, to passive intermodulation (PIM) downlink subspace acquisition.

BACKGROUND

Non-linear interference at a transceiver of a base station in a wireless communication system is generated when at least one offending signal is influenced by some non-linear behavior. This non-linear behavior could be experienced anywhere where the offending signals are present. The non-linear behavior could be in a radio, signal transmission line network, antenna system, or in the RF environment where the offending signals are transmitted. An offending signal is typically a downlink signal that interferes with a desired uplink signal due to the creation of non-linear intermodulation terms.

One of the problems associated with non-linear interference is when the interference couples into a receiver, and the interference overlaps an assigned frequency channel for the receiver. The interference will degrade the quality of the received signal in the receiver, thereby degrading performance.

In a network node, e.g., cellular base station, this non-linear behavior can be attributed to passive devices that exhibit passive intermodulation (PIM). The PIM sources could occur in many places. Some examples are in the radio's filter, connectors, cable assembly from the radio to the antenna, in multiplexers if multiple radios are multiplexed onto the same cable or antenna, in the antenna, or in the environment external to the antenna.

Non-linear interference generates interference at multiple frequencies. This interference can be problematic when some of the generated frequencies fall into an assigned receive channel of the base station. The interference can desensitize the receiver, thereby reducing performance of the receiver.

A block diagram of a frequency division duplex (FDD) massive multiple input multiple output (MIMO) system with PIM interference is shown in FIG. 1, where the following system parameters are referenced:
M downlink MIMO layers;
K uplink MIMO layers;
N downlink and uplink base station antennas;
$\omega\_DL$ is the downlink channel frequency;
$\omega\_UL$ is the uplink channel frequency;
$I\_s$ is the channel dimensions impacted by PIM—which could correspond to the total number of interference sources such as the PIM sources; and
$N\_L$ is the non-linear order of the PIM sources.

The system variables of the system of FIG. 1 are as follows:
b is a M×1 vector of the DL control and traffic signaling in the layer domain;
a is a N×1 vector of the pre-coded DL control and traffic signaling in the antenna domain;
s is a K×1 vector of the UL control and traffic signaling in the layer domain at the WD's;
r is a N×1 vector of the UL received control and traffic signaling in the antenna domain at the base station;
$H_{DL\_UE}$ 12 is a M×N matrix of the channel response from the base station to the WDs for each of the downlink subcarriers;
$H_{UL\_UE}$ 14 is a N×K matrix of the channel response from the WDs to the base station for each of the uplink subcarriers;
$H_{DL\_IF}$ 16 is a $I_s$×N matrix of the channel response from the base station to the PIM sources for each of the downlink subcarriers;
$H_{UL\_IF}$ 18 is a N×$I_s$ matrix of the channel response from the PIM sources to the base station for each of the uplink subcarriers;
$h_{NL}$ 20 are some non-linear time-domain models of the PIM sources;
$P_{DL}$ 22 is a N×M matrix of the beamforming weights for each of the DL subcarriers (PRB granularity may be used to reduce the implementation cost); and
$P_{UL}$ 24 is a K×N matrix of the beamforming weights for each of the UL subcarriers (PRB granularity may be used to reduce the implementation cost).

An expression for the downlink interference covariance matrix is as follows:

$$\hat{R}_{DL\_IF} = R^T_{UL\_IF}$$
$$= \left(U_{UL\_IF} \cdot \Sigma_{UL\_IF} \cdot U^H_{UL\_IF}\right)^T$$
$$= \left(U^H_{UL\_IF}\right)^T \cdot \Sigma^T_{UL\_IF} \cdot U^T_{UL\_IF}$$
$$= \overline{U}_{UL\_IF} \cdot \Sigma_{UL\_IF} \cdot U^T_{UL\_IF}$$

Where:
U is a N×N matrix formed by the N eigenvectors $[u_0, \ldots, u_{N-1}]$:
  The signal subspace of the interferers' channel covariance matrix—the interference subspace—corresponds to the $I_s$ dominant eigenvectors $U_{UL\_IF} = [u_0, \ldots, u_{I_s-1}]$; and
  The noise subspace of the uplink covariance matrix corresponds to the remaining eigenvectors $U_{Noise} = [u_{I_s}, \ldots, u_{N-1}]$;
$\Sigma$ is a N–N diagonal matrix with the diagonal elements set to the N uplink interference channel covariance matrix eigenvalues $\lambda_0, \ldots, \lambda_{N-1}$. The first elements $\lambda_i$, i=0, ..., $I_s$–1 are the interference eigenvalues while the remaining entries $\lambda_i$, i=$I_s$, ..., N–1 are noise eigenvalues;
The $(\bullet)^H$ operator denotes the Hermitian transpose (i.e. complex conjugate);
The non-conjugate transpose operator $(\bullet)^T$ implements the uplink-to-downlink channel conversion; and
The $\overline{(\bullet)}$ operator represents the matrix conjugation without transpose.

It is appreciated by those skilled in the art that the $\hat{R}_{DL\_IF}$ downlink interference covariance matrix estimation may additionally require an electrical transform to compensate for the different inter-element antenna spacing between the uplink and the downlink bands as shown in the following equation:

$$\hat{R}_{DL\_IF} = T_\lambda(R_{UL\_IF}{}^T)$$

where $T_\lambda(\bullet)$ is an electrical transform that is based either on multi-dimensional spatial Discrete Fourier Transforms (DFT) or based on other methods.

However, in frequency division duplex (FDD) systems with wide duplex gaps, some additional impairments created by mutual coupling and other antenna imperfections can create significant antenna response variations between the uplink and the downlink bands. As shown in FIG. 2, some analog black boxes 25 are introduced into the antenna model to capture the frequency dependent impairments from the subarrays. As illustrated in FIG. 2, the unknown responses vary from one subarray and/or antenna to the next. Therefore, for a system with N antennas, there are N different black boxes. The black box responses are a function of three input parameters: the frequency $\omega$, the elevation angle $\theta$ and the azimuth angle $\phi$.

Further, null-steering is much more sensitive to estimation errors than beam steering since the nulls are narrower than the beams. Therefore, the effect of these analog impairments must be captured to perform the PIM downlink null steering in FDD systems with wide duplex gaps.

SUMMARY

Some embodiments advantageously provide a method and system for passive intermodulation (PIM) downlink subspace acquisition.

Some embodiments take advantage of the natural "PIM feedback loop" to produce an estimate of the downlink interference covariance matrix, $\hat{R}_{DL\_IF}$. Some advantages of some of the embodiments described below may include one or more of the following:

Some embodiments work independently of the FDD uplink-to-downlink frequency separation;
Some embodiments work even in the case where significant subarray response impairments do exist; and/or
The PIM subspace is estimated during normal product operations; no special mode is needed.

According to one aspect, a method implemented in a first radio of a network node is provided. The method includes determining, via the processing circuitry, a downlink projection matrix based at least in part on downlink beamforming weights. The method also includes determining a first downlink interference covariance matrix estimate for a current downlink orthogonal frequency division multiplexed, OFDM, symbol based at least in part on multiplying the downlink projection matrix by a scaling factor that is dependent on a passive intermodulation, PIM, power generated in one or more uplink channels.

According to this aspect, in some embodiments, the scaling factor is based at least in part on a power of the current downlink OFDM symbol, a constant used to compensate for a difference in uplink power and downlink power and a received uplink PIM power. In some embodiments, the method further includes determining, via the PIM DL covariance matrix determiner, additional downlink interference covariance matrix estimates, one additional downlink interference covariance matrix estimate for each one of a plurality of OFDM symbols and averaging the first and additional downlink covariance matrices for the plurality of OFDM symbols to determine an average downlink interference covariance matrix. In some embodiments, the averaging is performed over a time period selected to capture a plurality of downlink precoding weights with an equal probability of occurrence. In some embodiments, the averaging is performed separately for each of a plurality of polarizations. In some embodiments, the averaging is performed jointly over a plurality of antennas of the network node. In some embodiments, the averaging is wideband averaging. In some embodiments, the averaging excludes downlink interference covariance matrix estimate for which the received uplink passive intermodulation power is below a threshold. In some embodiments, the method further includes determining a downlink interference covariance matrix for each of a plurality of downlink codebooks in sequence. In some embodiments, a received uplink PIM power is based at least in part on a measurement of PIM power, the measurement being received from a second radio of the network node.

According to another aspect, a first radio of a network node includes processing circuitry configured to determine a downlink projection matrix based at least in part on downlink beamforming weights. The processing circuitry is further configured to determine a first downlink interference covariance matrix estimate for a current downlink orthogonal frequency division multiplexed, OFDM, symbol based at least in part on multiplying the downlink projection matrix by a scaling factor that is dependent on a passive intermodulation, PIM, power generated in one or more uplink channels.

According to this aspect, in some embodiments, the scaling factor is based at least in part on a power of the current downlink OFDM symbol, a constant used to compensate for a difference in uplink power and downlink power and a received uplink PIM power. In some embodiments, the processing circuitry is further configured to determine additional downlink interference covariance matrix estimates, one additional downlink interference covariance matrix estimate for each one of a plurality of OFDM symbols. The processing circuitry is further configured to average the first and additional downlink interference covariance matrix estimates for the plurality of OFDM symbols to determine an average downlink interference covariance matrix estimate. In some embodiments, the averaging is performed over a time period selected to capture a plurality of downlink precoding weights with an equal probability of occurrence. In some embodiments, the averaging is performed separately for each of a plurality of polarizations. In some embodiments, the averaging is performed jointly over a plurality of antennas of the network node. In some embodiments, the averaging is wideband averaging. In some embodiments, the averaging excludes downlink interference covariance matrix estimates for which the received uplink passive intermodulation power is below a threshold. In some embodiments, the processing circuitry is further configured to determine a downlink interference covariance matrix estimate for each of a plurality of downlink codebooks in sequence. In some embodiments, a received uplink PIM power is based at least in part on a measurement of PIM power, the measurement being received from a second radio of the network node.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
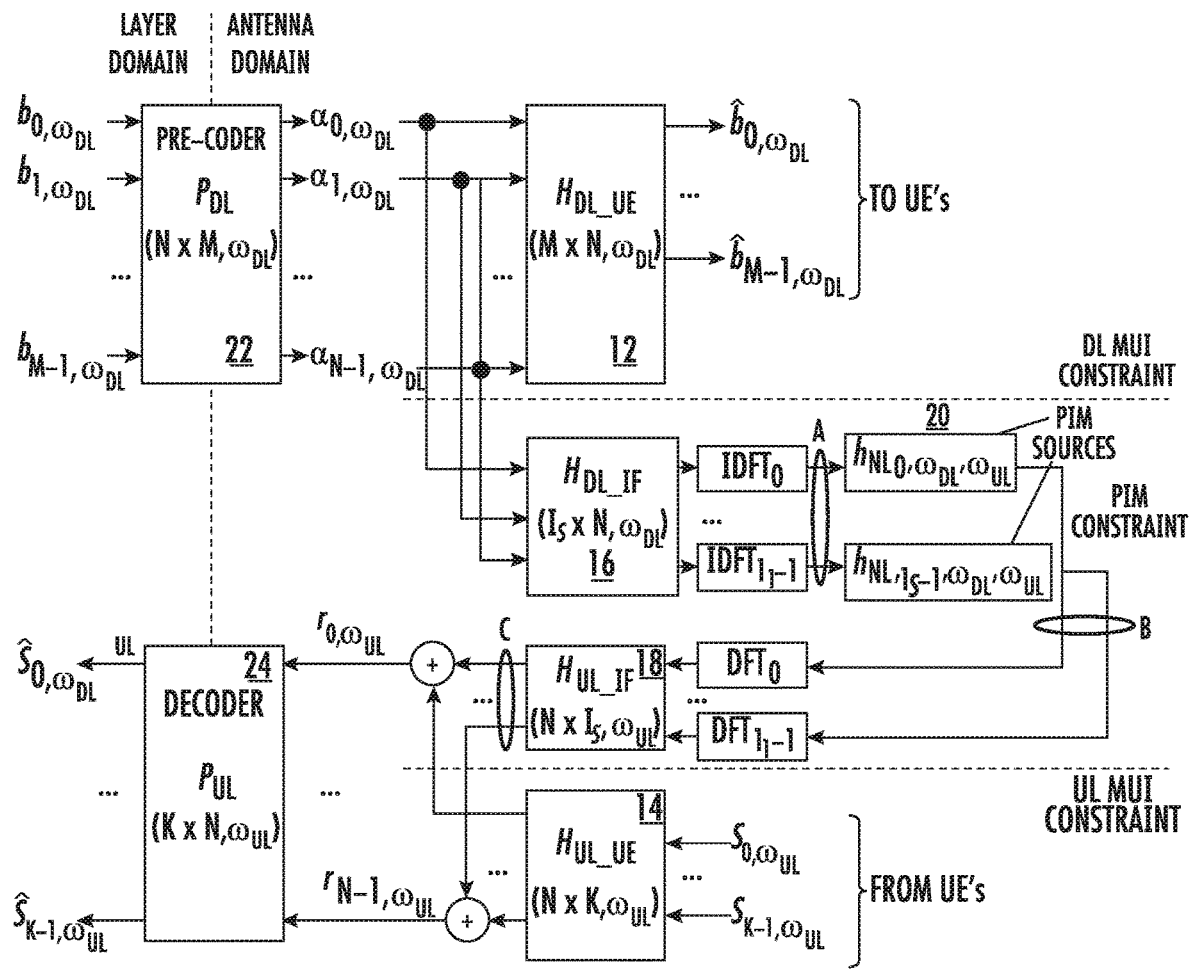
FIG. 1 is a block diagram of a frequency division duplex (FDD) massive multiple input multiple output (MIMO) system with PIM interference.
Figure 2:
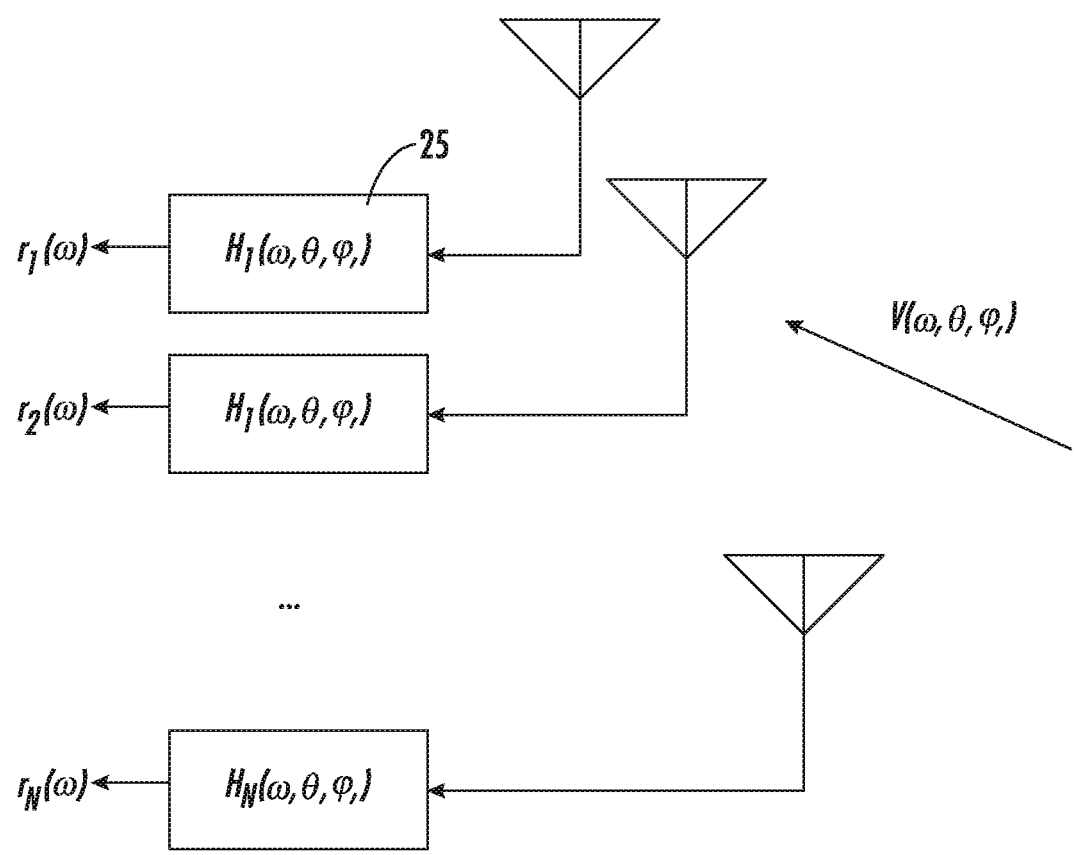
FIG. 2 illustrates a separate channel function in communication with a different antenna, the channel function being representative of subarray frequency dependent impairments.

Before describing in detail example embodiments, it is noted that the embodiments reside primarily in combinations of apparatus components and processing steps related to passive intermodulation (PIM) downlink subspace acquisition. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a WD or a radio network node.

Figure 3:
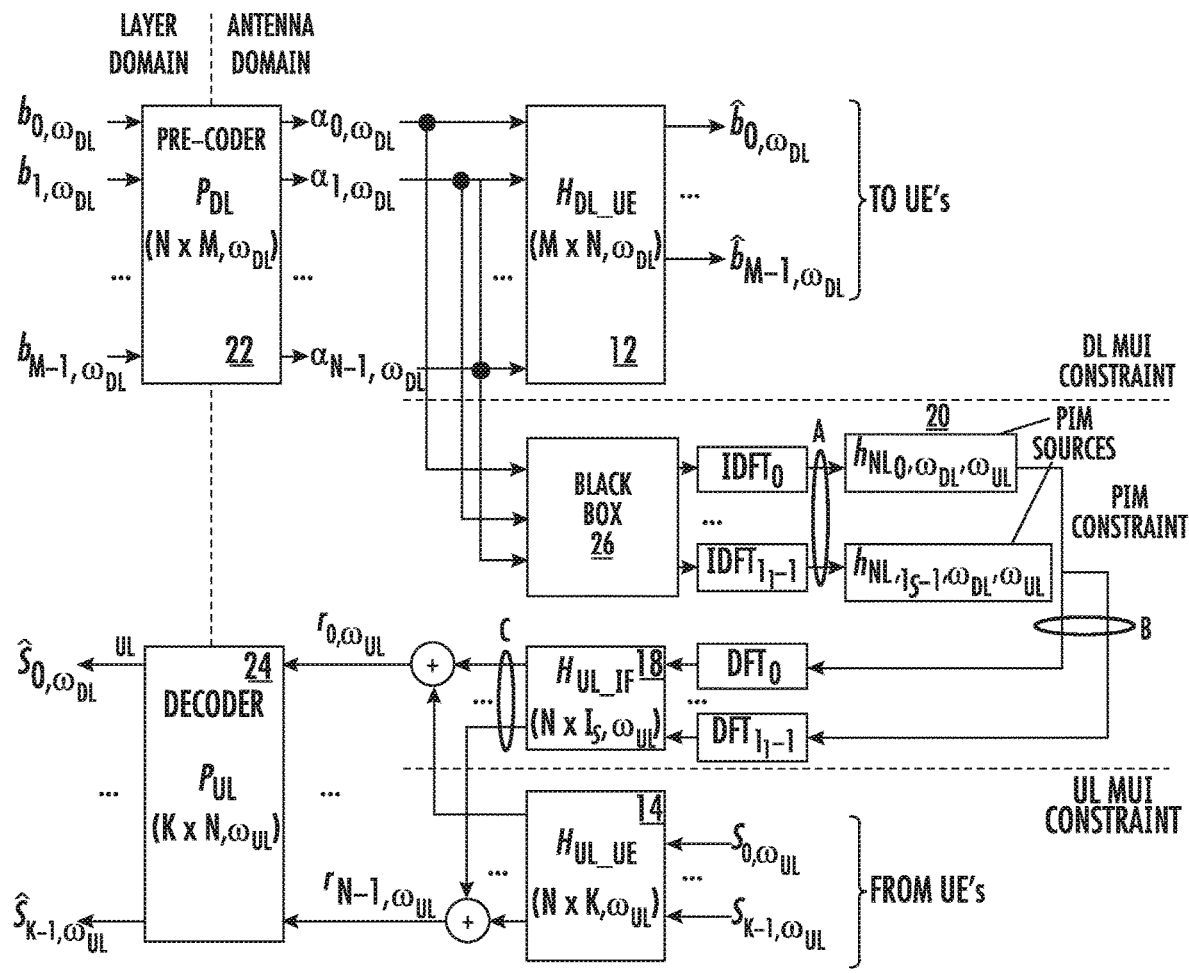
FIG. 3 is a block diagram of an FDD massive MIMO system with wide duplex gap.

Referring again to the drawing figures, where like elements have like reference numerals, there is shown in FIG. 3, a block diagram of an example embodiment for determining a PIM DL covariance matrix. The example and elements in FIG. 3 are the same as the example of FIG. 1, except for the block labeled "black box" in FIG. 3, which replaces the block labeled "$H_{DL\_IF}$" of FIG. 1. Thus, the DL PIM channel response is replaced by a black box 26, since, in accordance with the disclosure, the uplink PIM covariance matrix cannot directly be used for estimating the DL PIM subspace in FDD systems with wide duplex gaps.

Figure 4:
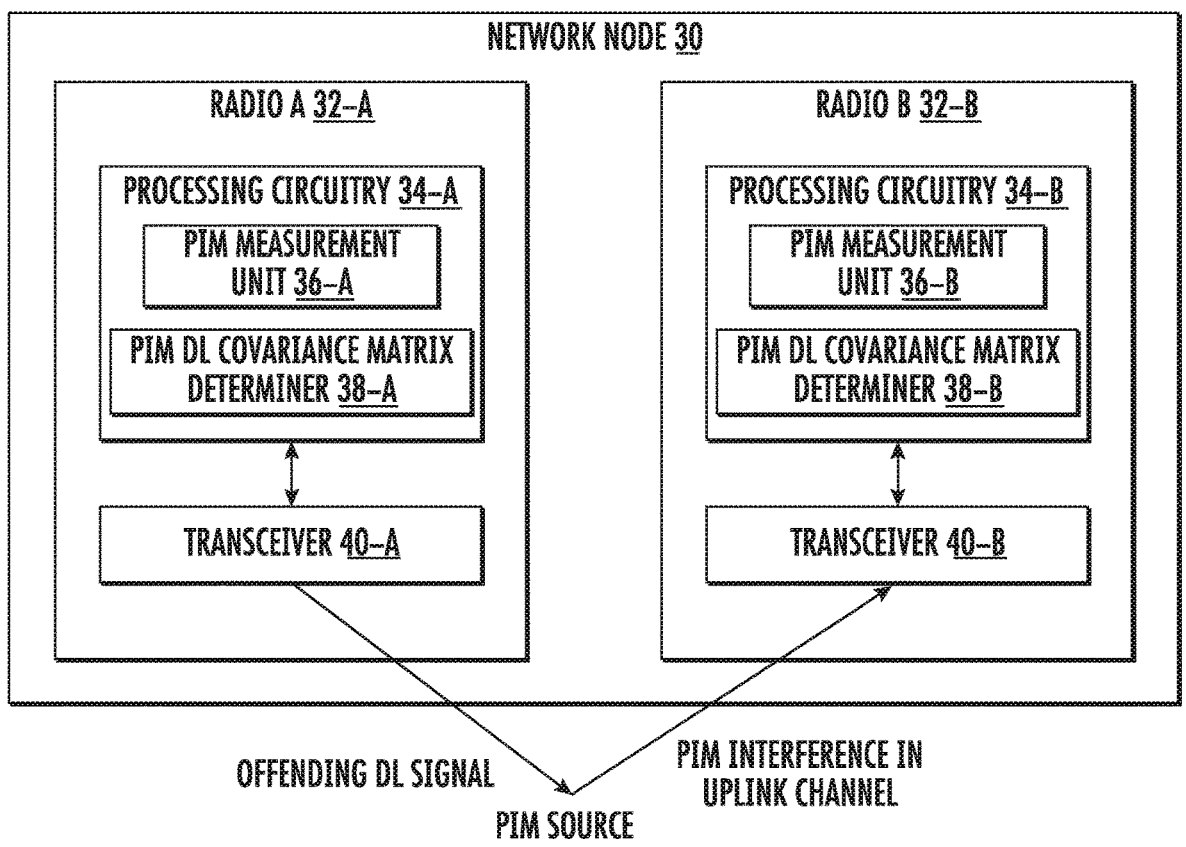
FIG. 4 is a block diagram of a network node with at least two radios, at least one of which is capable of null steering and another of which is capable of PIM measurement, and at least one of which is capable of PIM DL covariance matrix determination based on the PIM measurement.

In the example of FIG. 4, the PIM downlink covariance matrix determiner 38 may estimate the PIM downlink covariance matrix $\hat{R}_{DL\_IF}$ as follows:

$$\hat{R}_{DL\_IF} = E[P_{DL} \cdot (\sigma_{UL\_PIM}^2 + \alpha \cdot \sigma_{DL}^2) \cdot P_{DL}^H]$$

where
- $E[\cdot]$ is the expectation operator;
- $\sigma_{UL\_PIM}^2$ corresponds to the received uplink (UL) PIM power measured in real-time using, for example, methods that are known or become known;
- $\sigma_{DL}^2$ corresponds to the power of the current downlink (DL) orthogonal frequency division multiplexed (OFDM) symbol; and
- $\alpha$ is an arbitrary constant that is used to compensate for the UL-to-DL power difference.

A scaling factor is defined for each OFDM symbol. The scaling factor corresponds to the sum of the PIM power $\sigma_{UL\_PIM}^2$ that is generated in the uplink, plus an adjusted version of the DL OFDM symbol power $\alpha \cdot \sigma_{DL}^2$. The factor $\alpha$ is used to compensate for the UL-to-DL power difference. In other words, the scaling factor may be given by:

$$(\sigma_{UL\_PIM}^2 + \alpha \cdot \sigma_{DL}^2)$$

This may be computed by the PIM DL covariance matrix determiner 38. Then, the DL precoding weights $P_{DL}$ are used to form a downlink projection matrix that is multiplied by the scaling factor and averaged with the results from other OFDM symbols. The multiplying may be performed by PIM DL covariance matrix determiner 38. The averaging period may be sufficiently long to capture all possible DL precoding weights with an equal probability of occurrence. The averaging process of the equation for $\hat{R}_{DL\_IF}$ can be performed separately for each of the DL polarizations or it can be done combining all antennas together. The averaging process can be wideband, or it can be done using a finer frequency granularity.

Processing circuitry 34 may include control logic to assist the processing of the equation for $\hat{R}_{DL\_IF}$. The processing circuitry 34 may include a processor and memory. In particular, in addition to or instead of a processor, such as a central processing unit, and memory, the processing circuitry 34 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. Such processor may be configured to access (e.g., write to and/or read from) memory, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

For example, some conditional statements can be used to discard or retain the results for each OFDM symbol depending on whether the PIM uplink (UL) power $\sigma_{UL\_PIM}^2$ exceeds a predetermined threshold. For example, results of the computation of $\hat{R}_{DL\_IF}$ for an OFDM symbol may be discarded when the PIM UL power is less than the predetermined threshold.

The PIM subspace acquisition method disclosed herein works during the normal product operations. In an alternative embodiment, there could be a PIM subspace acquisition mode where all the possible DL codebooks are serially scanned.

The feedback assisted PIM subspace acquisition method described herein may be implemented in whole or in part in the cloud (i.e., at some central location or a plurality of locations connected through the Internet to the network node 30).

The feedback assisted PIM subspace acquisition method described herein takes advantage of the natural PIM feedback loop to weight the PIM contribution of different DL precoding weights. The weighted contributions are averaged over a time interval to produce an estimate of the downlink interference covariance matrix $\hat{R}_{DL\_IF}$.

FIG. 4 shows a block diagram of two radios A and B (32-A, 32-B), referred to collectively as radios 32, in the same network node 30. In this example, radio 32-A transmits a DL signal which illuminates a PIM source in the environment which in turn interferes with one or more uplink channels in radio 32-B, from which radio 32-B measures the PIM. This measured PIM may be referred to as the received uplink PIM power, from which the downlink interference covariance matrix, $\hat{R}_{DL\_IF}$, is determined.

The PIM measurement unit 36-B may measure PIM power for each of a plurality of DL precoding weights transmitted by the radio 32-A. The PIM DL covariance matrix determiner 38-A may determine the PIM DL covariance matrix, $\hat{R}_{DL\_IF}$, according to the equations set forth above and repeated here:

$$\hat{R}_{DL\_IF} = E[P_{DL} \cdot (\sigma_{UL\_PIM}^2 + \alpha \cdot \sigma_{DL}^2) \cdot P_{DL}^H]$$

Accordingly, each radio 32 may have processing circuitry (34-A, 34-B), a PIM measurement unit (36-A, 36-B), a PIM DL covariance matrix determiner (38-A, 38-B) and transceiver (40-A, 40-B). Each unit in radio 32-A operates similarly to each corresponding, similarly numbered, unit in radio 32-B.

In some embodiments, the PIM DL covariance matrix determiner 38 may be implemented as software instructions stored in memory and executable by a microprocessor. Such software may be stored in memory. The memory and microprocessor may be included in processing circuitry 34, described above.

Figure 5:
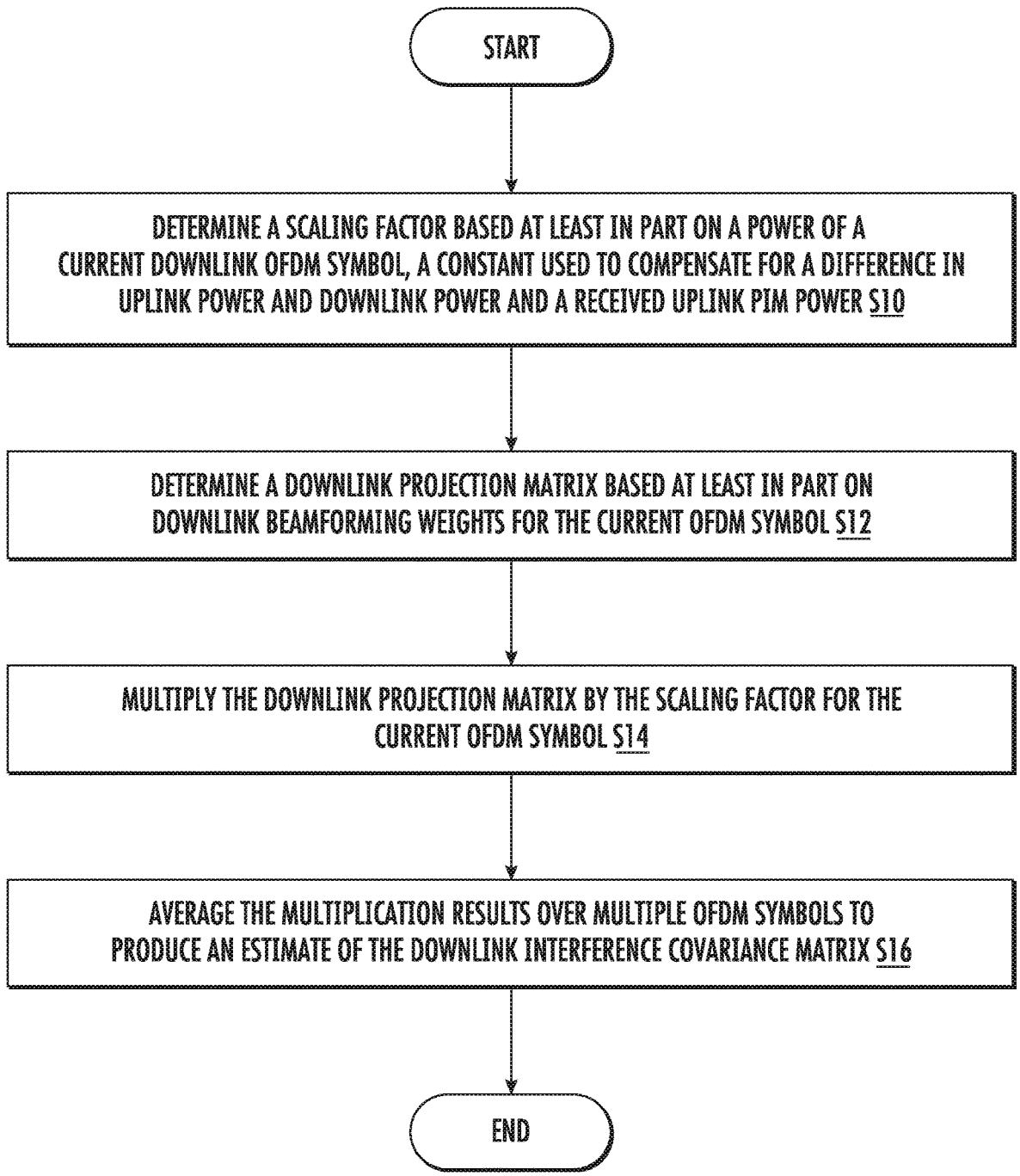
FIG. 5 is a flowchart of an example process for determining a PIM DL covariance matrix estimate.

FIG. 5 is a flowchart of an example process in a radio, such as a radio 32 of a network node 30, for determining a PIM DL covariance matrix. The process includes determining, via the processing circuitry 34, a scaling factor based at least in part on a power of a current downlink OFDM symbol, a constant used to compensate for a difference in uplink power and downlink power and a received uplink passive intermodulation, PIM, power (Block S10). The process also includes determining a downlink projection matrix based at least in part on downlink beamforming weights for the current OFDM symbol (Block S12). The process also includes multiplying the downlink projection matrix by the scaling factor for the current OFDM symbol (Block S14). The process further includes averaging the multiplication results over multiple OFDM symbols to produce an estimate of the downlink interference covariance matrix (Block S16).

Figure 6:
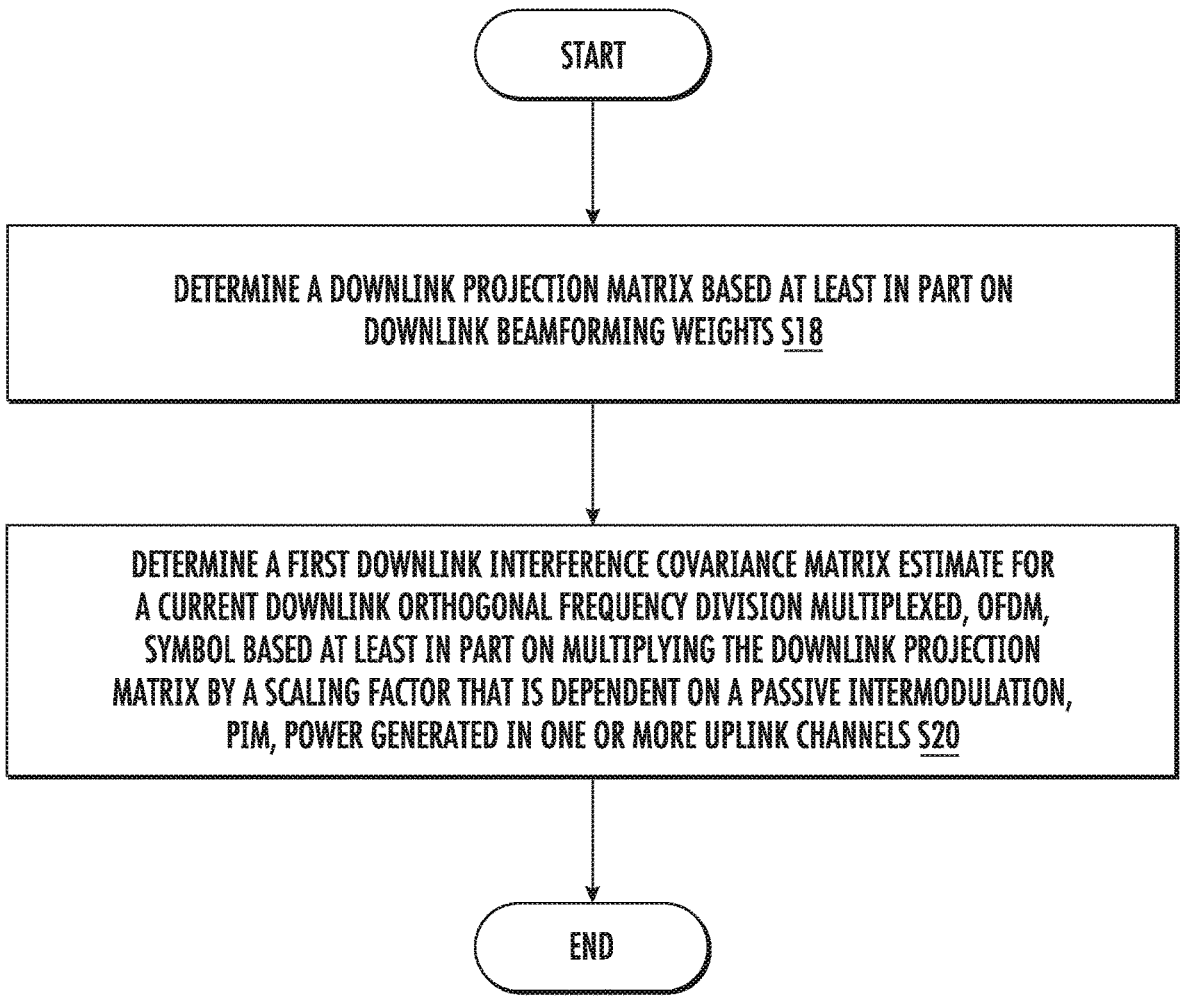
FIG. 6 is a flowchart of an alternative process for determining a PIM DL covariance matrix estimate.

FIG. 6 is a flowchart of an alternative process in a radio, such as a radio 32, of a network node 30, for determining a downlink interference covariance matrix estimate. The process includes determining a downlink projection matrix based at least in part on downlink beamforming weights (Block S18). The process further includes determining a first downlink interference covariance matrix estimate for a current downlink orthogonal frequency division multiplexed, OFDM, symbol based at least in part on multiplying the downlink projection matrix by a scaling factor that is dependent on a passive intermodulation, PIM, power generated in one or more uplink channels (Block S20).

Thus, according to one aspect, a method implemented in a first radio 32 of a network node 30 is provided. The method includes determining, via the processing circuitry 34, a downlink projection matrix based at least in part on downlink beamforming weights. The method also includes determining a first downlink interference covariance matrix estimate for a current downlink orthogonal frequency division multiplexed, OFDM, symbol based at least in part on multiplying the downlink projection matrix by a scaling factor that is dependent on a passive intermodulation, PIM, power generated in one or more uplink channels.

According to this aspect, in some embodiments, the scaling factor is based at least in part on a power of the current downlink OFDM symbol, a constant used to compensate for a difference in uplink power and downlink power and a received uplink PIM power. In some embodiments, the method further includes determining, via the PIM DL covariance matrix determiner 38, additional downlink interference covariance matrix estimates, one additional downlink interference covariance matrix estimate for each one of a plurality of OFDM symbols and averaging the first and additional downlink covariance matrices for the plurality of OFDM symbols to determine an average downlink interference covariance matrix estimate. In some embodiments, the averaging is performed over a time period selected to capture a plurality of downlink precoding weights with an equal probability of occurrence. In some embodiments, the averaging is performed separately for each of a plurality of polarizations. In some embodiments, the averaging is performed jointly over a plurality of antenna polarizations. In some embodiments, the averaging is wideband averaging. In some embodiments, the averaging excludes downlink interference covariance matrix estimate for which the received uplink passive intermodulation power is below a threshold. In some embodiments, the method further includes determining a downlink interference covariance matrix for each of a plurality of downlink codebooks in sequence. In some embodiments, a received uplink PIM power is based at least in part on a measurement of PIM power, the measurement being received from a second radio of the network node.

According to another aspect, a first radio 32 of a network node 30 includes processing circuitry 34 configured to determine a downlink projection matrix based at least in part on downlink beamforming weights. The processing circuitry 34 is further configured to determine a first downlink interference covariance matrix estimate for a current downlink orthogonal frequency division multiplexed, OFDM, symbol based at least in part on multiplying the downlink projection matrix by a scaling factor that is dependent on a passive intermodulation, PIM, power generated in one or more uplink channels.

According to this aspect, in some embodiments, the scaling factor is based at least in part on a power of the current downlink OFDM symbol, a constant used to compensate for a difference in uplink power and downlink power and a received uplink PIM power. In some embodiments, the processing circuitry 34 is further configured to determine additional downlink interference covariance matrix estimate, one additional downlink interference covariance interference matrix for each one of a plurality of OFDM symbols. The processing circuitry 34 is further configured to average the first and additional downlink interference covariance matrix estimates for the plurality of OFDM symbols to determine an average downlink interference covariance matrix estimate. In some embodiments, the averaging is performed over a time period selected to capture a plurality of downlink precoding weights with an equal probability of occurrence. In some embodiments, the averaging is performed separately for each of a plurality of polarizations. In some embodiments, the averaging is performed jointly over a plurality of antennas of the network node. In some embodiments, the averaging is wideband averaging. In some embodiments, the averaging excludes downlink interference covariance matrix estimates for which the received uplink passive intermodulation power is below a threshold. In some embodiments, the processing circuitry 34 is further configured to determine a downlink interference covariance matrix for each of a plurality of downlink codebooks in sequence. In some embodiments, a received uplink PIM power is based at least in part on a measurement of PIM power, the measurement being received from a second radio of the network node.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Some abbreviations which may be used herein are as follows:

| Abbreviation | Explanation |
| --- | --- |
| DL | Downlink |
| FDD | Frequency-Division Duplex |
| MIMO | Multiple-Input Multiple-Output |
| OFDM | Orthogonal Frequency Division Duplex |
| PIM | Passive-Intermodulation |
| UL | Uplink |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a first radio of a network node in communication with a wireless device, WD, the method comprising:
   determining a downlink projection matrix based at least in part on downlink beamforming weights; and
   determining a first downlink interference covariance matrix estimate for a current downlink orthogonal frequency division multiplexed, OFDM, symbol based at least in part on multiplying the downlink projection matrix by a scaling factor that is dependent on a passive intermodulation, PIM, power generated in one or more uplink channels.

2. The method of claim 1, wherein the scaling factor is based at least in part on a power of the current downlink OFDM symbol, a constant used to compensate for a difference in uplink power and downlink power and a received uplink PIM power.

3. The method of claim 2, further comprising:
determining additional downlink interference covariance matrix estimates, one additional downlink interference covariance matrix estimate for each one of a plurality of OFDM symbols; and
averaging the first and additional downlink interference covariance matrix estimates for the plurality of OFDM symbols to determine an average downlink interference covariance matrix estimate.

4. The method of claim 3, wherein the averaging is performed over a time period selected to capture a plurality of downlink precoding weights with an equal probability of occurrence.

5. The method of claim 3, wherein the averaging is performed separately for each of a plurality of antenna polarizations.

6. The method of claim 3, wherein the averaging is performed jointly over a plurality of antenna polarizations.

7. The method of claim 3, wherein the averaging is wideband averaging.

8. The method of claim 3, wherein the averaging is done separately for each subcarrier or groups of subcarriers.

9. The method of claim 3, wherein the averaging excludes downlink interference covariance matrix estimates for which the received uplink passive intermodulation power is below a threshold.

10. The method of claim 1, further comprising determining a downlink interference covariance matrix estimate for each of a plurality of downlink codebooks in sequence.

11. The method of claim 1, wherein a received uplink PIM power is based at least in part on a measurement of PIM power, the measurement being received from a second radio of the network node.

12. A first radio of a network node including processing circuitry configured to:
determine a downlink projection matrix based at least in part on downlink beamforming weights; and
determine a first downlink interference covariance matrix estimate for a current downlink orthogonal frequency division multiplexed, OFDM, symbol based at least in part on multiplying the downlink projection matrix by a scaling factor that is dependent on a passive intermodulation, PIM, power generated in one or more uplink channels.

13. The first radio of claim 12, wherein the scaling factor is based at least in part on a power of the current downlink OFDM symbol, a constant used to compensate for a difference in uplink power and downlink power and a received uplink PIM power.

14. The first radio of claim 13, wherein the processing circuitry is further configured to:
determine additional downlink covariance interference matrix estimates, one additional downlink interference covariance matrix estimate for each one of a plurality of OFDM symbols; and
average the first and additional downlink interference covariance matrix estimates for the plurality of OFDM symbols to determine an average downlink interference covariance matrix estimate.

15. The first radio of claim 14, wherein the averaging is performed over a time period selected to capture a plurality of downlink precoding weights with an equal probability of occurrence.

16. The first radio of claim 14, wherein the averaging is performed separately for each of a plurality of polarizations.

17. The first radio of claim 14, wherein the averaging is performed jointly over a plurality of antenna polarizations.

18. The first radio of claim 14, wherein the averaging is wideband averaging.

19. The first radio of claim 14, wherein the averaging is done separately for each subcarrier or groups of subcarriers.

20. The first radio of claim 14, wherein the averaging excludes downlink interference covariance matrix estimates for which the received uplink passive intermodulation power is below a threshold.

21. The first radio of claim 12, wherein the processing circuitry is further configured to determine a downlink interference covariance matrix estimate for each of a plurality of downlink codebooks in sequence.

22. The first radio of claim 12, wherein a received uplink PIM power is based at least in part on a measurement of PIM power, the measurement being received from a second radio of the network node.

* * * * *